United States Patent Office 2,789,100
Patented Apr. 16, 1957

2,789,100

STABILIZED VINYL CHLORIDE COMPOSITIONS

Joseph E. Wilson, New Brunswick, N. J., assignor to Union Carbide and Carbon Corporation, a corporation of New York No Drawing. Application February 24, 1953,
Serial No. 338,616

12 Claims. (Cl. 260—31.8)

Those artificial resins known collectively as vinyl resins have attained wide recognition in the field of plastics. Of this class, the resins which are obtained by the polymerization of a vinyl halide, usually vinyl chloride, are probably the most widely known, particularly those resins such as are formed by the conjoint polymerization of vinyl chloride with vinyl esters of aliphatic acids or with unsaturated polymerizable compounds.

It is well known that these resins tend to decompose when heated to the extent required in their formation and fabrication into various products. Generally this decomposition is accompanied by discoloration or embrittlement or both and is attributed in part to the liberation of hydrogen chloride from the polymer. It is also attributed in part to oxidation of the polymer, high processing temperatures, and the instability of normally employed resin modifiers such as plasticizers, lubricants, and dyes.

To overcome decomposition resulting from the liberation of hydrogen chloride, it has long been the practice to add compounding substances, generally known as stabilizers or acceptors to the polymers. These substances either neutralize the acid or they combine readily with hydrogen chloride to form relatively inert compounds. They generally do not, however, overcome decomposition resulting from other causes referred to above, and for this reason there is usually some residual color in polymers containing vinyl chloride so stabilized.

Accordingly, it is an object of this invention to provide new vinyl chloride resin compositions which are not subject to decomposition and the resulting discoloration or embrittlement or both.

It has been found that vinyl chloride resin compositions, already stabilized against decomposition resulting from the liberation of hydrogen chloride, may be further stabilized against such decomposition and also stabilized against decomposition resulting from other causes by the addition of small amounts of ethyl ortho-silicate. While neither stabilizer is sufficient as of itself to fully prevent decomposition of vinyl chloride resin compositions, they do, when employed together, produce a synergistic stabilizing effect.

Those resins which may be stabilized in accordance with the present invention include the chlorine-containing vinyl resins such as the polymers of vinyl chloride; conjoint polymers of vinyl chloride with vinyl esters of aliphatic acids, with esters of acrylic and methacrylic acids, and with acrylonitrile; after chlorinated vinyl polymers; and the chlorine-containing vinylidene resins such as polymers of vinylidene chloride and conjoint polymers of vinylidene chloride with vinyl chloride; and other polymerizable compositions. The conjoint polymers which may be stabilized according to the invention are those containing at least 10 percent by weight of vinyl chloride. Of particular importance are those conjoint polymers containing from 70 percent to 98 percent by weight of vinyl chloride and from 2 percent to 30 percent by weight of another polymerizable compound.

The stabilizers may be incorporated in the resin by any of the well known methods so long as a uniform distribution is obtained. In instances where the composition is to be employed in molding, extruding or calendering operations, the stabilizers may be admixed with the vinyl resin on a two-roll mill or in a Banbury mixer. Generally the stabilizers together with other normally employed modifiers, such as plasticizers, lubricants, and pigments, are incorporated in a single operation. The amount of ethyl ortho-silicate added varies from about 0.5 percent to about 10 percent by weight of the resin.

The following examples more fully disclose my invention.

EXAMPLE I

Polyvinyl chloride resin powder was blended with two plasticizers, di(2-ethylhexyl)phthalate and di(2-ethylhexyl)adipate, and a stabilizer, dibutyl tin dilaurate, to prevent decomposition resulting from the liberation of hydrogen chloride; in the proportions listed below for composition 1A. Another composition, 1B, was blended from the identical ingredients and contained, in addition, 1 percent by weight of the vinyl chloride resin of ethyl ortho-silicate.

*Table I*

FORMULATIONS

| | Composition 1A (parts) | Composition 1B (parts) |
|---|---|---|
| Polyvinyl chloride resin | 100 | 100 |
| Di(2-ethylhexyl)phthalate | 23 | 23 |
| Di(2-ethylhexyl)adipate | 23 | 23 |
| Dibutyl tin dilaurate | 2 | 2 |
| Ethyl ortho-silicate | | 1 |

The two compositions were milled on a 12-inch mill at 170° C. to form sheets of 0.040 inch thickness. Samples of the milled sheets were removed at 10-minute intervals after the start of milling and the reflectance of blue light measured, since differences in such reflectance provide a reliable index of the amount of discoloration. To measure the reflectance, a photometer was employed and adjusted to read 100 percent reflectance from a white block of magnesium oxide.

MILLING TEST, 170° C.

| | Percent Blue Light Reflectance After— | | | | | |
|---|---|---|---|---|---|---|
| | 0 Min. | 10 Min. | 20 Min. | 30 Min. | 40 Min. | 50 Min. |
| 1A | 87 | 90 | 84 | 80 | 70 | 72 |
| 1B | 89 | 90 | 90 | 87 | 88 | 84 |

The prepared sheets were both transparent; however, composition 1B containing ethyl ortho-silicate was considerably lighter in color as visually observed and as also indicated by the blue light reflectance measurements.

EXAMPLE II

Compounds having the identical composition as those described in Example I were blended and milled for 10 minutes on a 12-inch mill at 170° C. to form sheets of 0.040 inch thickness. Samples of the prepared sheets were then subjected to a heat aging test conducted at 158° C. in an air oven. At one-half hour periods the samples were withdrawn from the oven and the reflectance of blue light measured.

Table II

AIR OVEN AGING, 158° C.

| | Percent Blue Light Reflectance After— | | | | | | | |
|---|---|---|---|---|---|---|---|---|
| | 0.0 Hr. | 0.5 Hr. | 1.0 Hr. | 1.5 Hr. | 2.0 Hr. | 2.5 Hr. | 3.0 Hr. | 3.5 Hr. |
| 1A | 84 | 79 | 76 | 75 | 45 | 20 | 9 | |
| 1B | 89 | 85 | 84 | 83 | 77 | 76 | 67 | 52 |

The above comparison of blue light reflectance clearly indicates that after 3½ hours of heating, sample 1B, containing ethyl ortho-silicate in addition to a hydrogen chloride acceptor, was markedly superior to sample 1A in terms of appearance and in terms of reflectance.

EXAMPLE III

Polyvinyl chloride resin powder was blended with two plasticizers, di(2-ethylhexyl)phthalate and di(2-ethylhexyl)adipate, and two stabilizers, phenyl salicylate and dibutyl tin dilaurate in the proportions listed below for composition 3A. Another composition, 3B, was blended from the identical ingredients and contained in addition 1 percent by weight of the vinyl chloride resin of ethyl ortho-silicate, which was introduced in place of a portion of the phenyl salicylate stabilizer.

Table III

FORMULATIONS

| | Composition 3A (parts) | Composition 3B (parts) |
|---|---|---|
| Polyvinyl chloride resin | 100 | 100 |
| Di(2-ethylhexyl)phthalate | 23 | 23 |
| Di(2-ethylhexyl)adipate | 23 | 23 |
| Dibutyl tin dilaurate | 2 | 2 |
| Phenyl salicylate | 2 | 1 |
| Ethyl ortho-silicate | | 1 |

The two compositions were milled on a 12-inch mill at 170° C. to form two sheets of 0.040 inch thickness. Samples of the milled sheets were removed at 10 minute intervals after the start of milling and the reflectance of blue light measured, since differences in such reflectance provide a reliable index of the amount of discoloration. To measure the reflectance, a photometer was employed and adjusted to read 100 percent reflectance from a white block of magnesium oxide.

MILLING TEST, 170° C.

| | Percent Blue Light Reflectance After— | | | | | |
|---|---|---|---|---|---|---|
| | 0 Min. | 10 Min. | 20 Min. | 30 Min. | 40 Min. | 50 Min. |
| 3A | 87 | 85 | 79 | 66 | 44 | 52 |
| 3B | 86 | 87 | 84 | 82 | 68 | 73 |

The prepared sheets were both transparent; however, composition 3B, containing ethyl ortho-silicate, was considerably lighter in color as visually observed and as also indicated by the blue light reflectance measurements.

EXAMPLE IV

Compounds having the identical composition as those described in Example III were blended and milled for 10 minutes on a 12-inch mill at 170° C. to form sheets of 0.040 inch thickness. Samples of the prepared sheets were then subjected to a heat aging test conducted at 158° C. in an air oven. At one-half hour periods the samples were withdrawn from the oven and the reflectance of blue light measured.

AIR OVEN TEST, 158° C.

| | Percent Blue Light Reflectance After— | | | | | | | |
|---|---|---|---|---|---|---|---|---|
| | 0.0 Hr. | 0.5 Hr. | 1.0 Hr. | 1.5 Hr. | 2.0 Hr. | 2.5 Hr. | 3.0 Hr. | 3.5 Hr. |
| 3A | 85 | 79 | 70 | 54 | 29 | 21 | 8 | |
| 3B | 87 | 85 | 83 | 78 | 71 | 65 | 59 | 16 |

The above comparison of blue light reflectance clearly indicates that after 3 hours of heating, sample 3B, containing ethyl ortho-silicate was markedly superior to sample 3A in terms of appearance and in terms of reflectance.

EXAMPLE V

To illustrate the stabilizing effect of our stabilizers on opaque compositions containing polyvinyl chloride, samples were prepared containing titanium dioxide. In this instance polyvinyl chloride resin was blended with a plasticizer, di(2-ethylhexyl)phthalate; a stabilizer, lead phosphite, to prevent decomposition resulting from the liberation of hydrogen chloride; a lubricant, stearic acid; and coloring material, titanium dioxide; in the proportions listed below for composition 5A. Another composition, 5B, was blended from the identical ingredients and contained, in addition, 1 percent by weight of the vinyl chloride resin of ethyl ortho-silicate. The two compositions were milled on a 12-inch mill to form two sheets of 0.040 inch thickness.

Table V

FORMULATIONS

| | Composition 5A (parts) | Composition 5B (parts) |
|---|---|---|
| Polyvinyl chloride resin | 400 | 400 |
| Di(2-ethylhexyl)phthalate | 160 | 160 |
| Lead phosphite | 8 | 8 |
| Stearic acid | 2.0 | 2.0 |
| Titanium dioxide | 4.0 | 4.0 |
| Ethyl ortho-silicate | | 4.0 |

Samples of prepared sheets were then subjected to a heat aging test conducted at 158° C. in an air oven. At one-half hour periods the samples were withdrawn from the oven and the reflectance of blue light measured.

AIR OVEN AGING TEST, 158° C.

| | Percent Blue Light Reflectance After— | | | | | |
|---|---|---|---|---|---|---|
| | 0.0 Hr. | 1.0 Hr. | 2.0 Hr. | 3.0 Hr. | 4.0 Hr. | 5.0 Hr. |
| 5A | 86 | 83 | 80 | 44 | 47 | 33 |
| 5B | 88 | 84 | 79 | 73 | 68 | 46 |

Sample 5B, containing ethyl ortho-silicate after five hours of heating reflected a greater quantity of blue light than sample 5A.

An additional advantage of my invention is that the prepared samples did not either before or after heating possess a trace of an objectionable odor. This feature is of particular importance, as there has been reported in the industry numerous instances wherein the use of polyvinyl chloride compositions is limited because of objectionable odors apparently caused by the heretofore employed stabilizers.

The stabilizers, which prevent decomposition of vinyl chloride polymers resulting from the liberation of hydrogen chloride, and which may be employed with ethyl ortho-silicate to more fully stabilize such polymers or compositions thereof, include those that are conventionally employed in the art. Thus I may employ the organotin compounds, such as dibutyl tin dilaurate and dibutyl tin maleate; lead compounds, such as lead carbonate, tribasic lead sulfate, litharge, lead salicylate, lead maleate, dibasic lead phosphite, dibasic lead phthalate; alkali and alkaline metal salts, such as sodium carbonate, trimagnesium phosphate and calcium stearate; and epoxy compounds, such as glycidyl oleate, the diglycidyl ethers of diphenols and glycidyl oleate. The particular stabilizer employed for the purpose forms no part of my invention as of itself. Such stabilizers do, however, constitute a part of my invention when they are employed with ethyl ortho-silicate to fully stabilize vinyl chloride resins or compositions against decomposition.

My invention is not to be restricted to the stabilization of those vinyl chloride compositions containing the particular modifiers disclosed in the above examples, but is instead to include such compositions containing any of the well known plasticizers, lubricants, and coloring matter employed in the art. Commonly employed plasticizers include the monomeric or polymeric esters of mono- and difunctional acids and alcohols; esters of mono- and difunctional acids and ether-alcohols, such as di(butoxyethyl)phthalate; epoxy compounds, such as glycidyl oleate and epoxidized soy bean oil; esters of alcohols and phosphoric acid, such as tri(2-ethylhexyl) phosphate and diphenyl mono-octyl phosphate.

I claim as my invention:

1. A composition of matter comprising a polyvinyl chloride resin, a plasticizer for said resin, dibutyl tin dilaurate and from 0.5 to 10 percent by weight of the resin of ethyl ortho-silicate.

2. A composition of matter comprising a polyvinyl chloride resin, a plasticizer for said resin, lead phosphite and from 0.5 to 10 percent by weight of the resin of ethyl ortho-silicate.

3. A composition of matter comprising a polyvinyl chloride resin, di(2-ethylhexyl)phthalate, dibutyl tin dilaurate, and from 0.5 to 10 percent by weight of the resin of ethyl ortho-silicate.

4. A composition of matter comprising a polyvinyl chloride resin, di(2-ethylhexyl)phthalate, lead phosphite and from 0.5 to 10 percent by weight of the resin of ethyl ortho-silicate.

5. A composition of matter comprising a chlorine-containing polyvinyl resin which tends to liberate hydrogen chloride and decompose when subjected to elevated temperatures and two different stabilizers, one of said stabilizers consisting of a basic reacting compound capable of reacting with hydrogen chloride and the other of said stabilizers consisting of ethyl ortho-silicate, said ethyl ortho-silicate being present in said composition in an amount of from 0.5 to about 10 percent by weight of said chlorine-containing vinyl resin.

6. A composition of matter comprising a polyvinyl chloride resin which tends to liberate hydrogen chloride and decompose when subjected to elevated temperatures and two different stabilizers, one of said stabilizers consisting of a basic reacting compound capable of reacting with hydrogen chloride and the other of said stabilizers consisting of ethyl ortho-silicate, said ethyl ortho-silicate being present in said composition in an amount of from 0.5 to about 10 percent by weight of said polyvinyl chloride resin.

7. A composition of matter comprising a chlorine-containing polyvinyl resin which tends to liberate hydrogen chloride and decompose when subjected to elevated temperatures and two different stabilizers, one of said stabilizers consisting of dibutyl tin dilaurate and the other of said stabilizers consisting of ethyl ortho-silicate, said ethyl ortho-silicate being present in said composition in an amount of from 0.5 to about 10 percent by weight of said chlorine-containing vinyl resin.

8. A composition of matter comprising a chlorine-containing polyvinyl resin which tends to liberate hydrogen chloride and decompose when subjected to elevated temperatures and two different stabilizers, one of said stabilizers consisting of lead phosphite and the other of said stabilizers consisting of ethyl ortho-silicate, said ethyl ortho-silicate being present in said composition in an amount of from 0.5 to about 10 percent by weight of said chlorine-containing vinyl resin.

9. A composition of matter comprising a chlorine-containing polyvinyl resin which tends to liberate hydrogen chloride and decompose when subjected to elevated temperatures, a plasticizer for said resin and two different stabilizers, one of said stabilizers consisting of a basic reacting compound capable of reacting with hydrogen chloride and the other of said stabilizers consisting of ethyl ortho-silicate, said ethyl ortho-silicate being present in said composition in an amount of from 0.5 to about 10 percent by weight of said chlorine-containing vinyl resin.

10. A composition of matter comprising a polyvinyl chloride resin which tends to liberate hydrogen chloride and decompose when subjected to elevated temperatures, a plasticizer for said resin and two different stabilizers, one of said stabilizers consisting of a basic reacting compound capable of reacting with hydrogen chloride and the other of said stabilizers consisting of ethyl ortho-silicate, said ethyl ortho-silicate being present in said composition in an amount of from 0.5 to about 10 percent by weight of said polyvinyl chloride resin.

11. A composition of matter comprising a vinyl-chloride-vinylidene-chloride copolymer resin which tends to liberate hydrogen chloride and decompose when subjected to elevated temperatures and two different stabilizers, one of said stabilizers consisting of a basic reacting compound capable of reacting with hydrogen chloride and the other of said stabilizers consisting of ethyl ortho-silicate, said ethyl ortho-silicate being present in said composition in an amount of from 0.5 to about 10 percent by weight of said vinyl-chloride-vinylidene-chloride copolymer resin.

12. A composition of matter comprising a chlorine-containing resin, which tends to liberate hydrogen chloride and decompose when subjected to elevated temperatures, taken from the class consisting of chlorine-containing vinyl resins and polyvinylidene chloride resin and two different stabilizers, one of said stabilizers consisting of a basic reacting compound capable of reacting with hydrogen chloride and the other of said stabilizers consisting of ethyl ortho-silicate, said ethyl ortho-silicate being present in said composition in an amount of from 0.5 to about 10 percent by weight of said chlorine-containing resin.

References Cited in the file of this patent

UNITED STATES PATENTS 2,597,987   Harding _____ May 27, 1952

OTHER REFERENCES

Page 117, Principles of High Polymer Theory and Practice, Schmidt and Marlies, pub., 1948, McGraw-Hill Book Co., New York.